United States Patent
Stiglic et al.

(10) Patent No.: US 8,195,100 B2
(45) Date of Patent: Jun. 5, 2012

(54) TRANSPONDER CIRCUIT WITH DOUBLE CLOCK EXTRACTOR UNIT

(75) Inventors: Maksimilijan Stiglic, Maribor (SI); Zoran Randjelovic, Marin (CH)

(73) Assignee: EM Microelectronic-Marin SA, Marin (CH)

( * ) Notice: Subject to any disclaimer, the term of this patent is extended or adjusted under 35 U.S.C. 154(b) by 1048 days.

(21) Appl. No.: 12/110,760

(22) Filed: Apr. 28, 2008

(65) Prior Publication Data

US 2008/0266061 A1 Oct. 30, 2008

(30) Foreign Application Priority Data

Apr. 26, 2007 (EP) .................................... 07106985

(51) Int. Cl.
*H04B 1/38* (2006.01)
(52) U.S. Cl. .......................................................... 455/73
(58) Field of Classification Search ................... 455/73; 340/10.5, 10.51
See application file for complete search history.

(56) References Cited

U.S. PATENT DOCUMENTS

2004/0155755 A1* 8/2004 Bui et al. .................... 340/10.51

FOREIGN PATENT DOCUMENTS

| EP | 0 883 078 A2 | 12/1998 |
| EP | 0 936 574 A2 | 8/1999 |
| EP | 1280099 A1 | 1/2003 |
| EP | 1 301 898 B1 | 6/2006 |
| WO | 02/09028 A1 | 1/2002 |

OTHER PUBLICATIONS

EM 4205 and EM 4305 "512 bit Read/Write Contactless Identification Device," of EM Microelectronic-Marin SA.
European Search Report issued in corresponding application No. EP 07 10 6985, completed Oct. 24, 2007.

* cited by examiner

*Primary Examiner* — Lewis West
(74) *Attorney, Agent, or Firm* — Griffin & Szipl, P.C.

(57) ABSTRACT

The transponder circuit comprises a double clock extractor unit (31, 32, 33), an antenna coil connected to a modulator rectifier block to supply a rectified supply voltage on the basis of a picked up radio-frequency signal, and a control logic receiving a clock signal (CLK) of the double clock extractor unit. The control logic supplies a modulation signal (MOD) to the modulator rectifier block as well as to the double clock extractor unit. A terminal (B1) of the antenna coil is connected to the double clock extractor unit, which comprises a first sensitive clock extractor, which is a comparator (32) with a sensitivity threshold defined by a low reference voltage (Vref), and a second clock extractor, which consists of two successive inverters (31, 33). The unit also comprises a multiplexer (37) to receive as input the clock signal (CLK_ON) of the first clock extractor (32) and the clock signal (CLK_OFF) of the second inverter clock extractor (31, 33), and to supply as output one of the selected clock signals (CLK). The unit additionally comprises a flip-flop (36), which receives as input the modulation signal and a combined signal depending on the modulation signal and the clock signal (CLK_OFF) of the second clock extractor. The flipflop supplies as output a selection signal (SEL) to the multiplexer depending on the status of each of the signals at the input of the flip-flop.

9 Claims, 3 Drawing Sheets

TRANSPONDER CIRCUIT WITH DOUBLE CLOCK EXTRACTOR UNIT

This application claims priority from European Patent Application No. 07106985.0 filed Apr. 26, 2007, the entire disclosure of which is incorporated herein by reference

FIELD OF THE INVENTION

The invention relates to a transponder circuit with double clock extractor unit. The transponder circuit comprises an antenna coil connected to a modulator rectifier block to supply a rectified voltage for supply of the circuit on the basis of an alternating magnetic field of a picked up radio-frequency signal. A terminal of the antenna coil is connected to the double clock extractor unit, which supplies a clock signal to a control logic. This control logic allows a modulation signal to be supplied to the modulator rectifier block for the transmission of a data signal via the antenna coil.

BACKGROUND OF THE INVENTION

The use of a double clock extractor in a passive type transponder circuit is known in particular from patent EP 1 301 898. The passive transponder circuit comprises an antenna to pick up a sinusoidal electromagnetic data or control signal coming from a reader close by. The antenna is connected to the double clock extractor and to a rectifier that produces a stable rectified voltage for supply to sections of the transponder circuit on the basis of the picked up electromagnetic signal. The transponder circuit also comprises a demodulator, a logic control circuit and a modulator. The demodulator is connected between the double clock extractor and the logic circuit, whereas the modulator is controlled by the logic circuit for transmission of a data signal via the antenna.

The first low clock extractor of the transponder circuit of patent EP 1 301 898 is formed by means of two single inverters, of which the switching threshold voltage is close to 1 V. A clock signal fed to the demodulator is produced by this first clock extractor only if the amplitude of the signal picked up by the antenna is higher than 1 V, otherwise the clock signal is interrupted. The second high clock extractor is formed by means of a PMOS input transistor, a polarised inverter controlled by the input transistor, a rectifier and two current sources. A clock signal fed to the demodulator is produced by this second clock extractor only if the amplitude of the signal picked up by the antenna is higher than a high switching threshold higher than the threshold of the first clock extractor.

When the reader interrupts the transmission of the sinusoidal signal during a specific period, the amplitude of the signal received by the antenna of the transponder circuit decreases slowly. The clock signal of the second high clock extractor is interrupted before the clock signal of the first low clock extractor. Because of this, the double clock extractor with two levels of different thresholds only assures a pause of very short duration before a new transmission of the sinusoidal signal of the reader. However, this transponder circuit with double clock extractor is not provided to detect an interruption in the magnetic field of the signal produced by the reader before a demodulation of data or commands subsequent to the interruption in the field. Moreover, a selection of the clock signal of one clock extractor or the other is not provided for the demodulator in the case where the modulator is in operation, since the modulator must not be in operation during receipt of the electromagnetic signal.

For various low-power applications, a passive transponder circuit can comprise a single sensitive clock extractor, which requires a sensitivity close to 100 mV. This sensitive clock extractor can be used even if the amplitude of the signal picked up by the antenna coil of the transponder circuit is below 150 mV at maximum, when a switch of the modulator is in a switched-on or conductive status ON.

In order to start a demodulation of data received in the alternating magnetic field of the signal picked up by the antenna coil, an interruption in the field of the picked up signal generated by an adjacent reader must firstly be detected in general. However, a transponder circuit fitted with a sensitive clock extractor is not generally able to detect this field interruption when the switch of the modulator is in a switched-off status OFF. In this switched-off status OFF, with a first interruption in the alternating magnetic field of the reader, a float in voltage on the coil is observed without this voltage reaching earth potential. The reason for this is that the resistor or resistors of the modulator are not arranged in parallel with the antenna of the resonant circuit as is the case when the switch is in a switched-on status ON. Therefore, there is a rearward voltage leak towards the antenna coil, since the rectifier does not operate below a switching threshold corresponding to that of an inverter, e.g. in the order of 0.6 V.

If the voltage at the coil is stabilised, for example, to 300 mV, everything will depend on the threshold of the clock extractor with respect to the detection of an interruption in the field of the picked up signal. As a result, since the clock extractor is sensitive from 100 mV, detection of the interruption in the magnetic field of the picked up signal cannot occur in principle, if the voltage at the coil is stabilised to 300 mV.

SUMMARY OF THE INVENTION

Therefore, the main aim of the invention is to provide a transponder circuit with double clock extractor that is capable of detecting an interruption in the alternating magnetic field of a signal picked up by the antenna coil irrespective of the status of a modulator in operation in order to remedy the disadvantages outlined above.

For this purpose, the invention relates to a transponder circuit with double clock extractor unit outlined herein.

Advantageous practical examples of the transponder circuit with double clock extractor unit are disclosed herein later.

An advantage of the transponder circuit is that the first sensitive clock extractor of the double clock extractor unit is selected when a modulation signal for the modulator is in a first status, whereas the second inverter clock extractor is selected when the modulation signal for the modulator is in a second status. The first high status of the control signal allows a switch of the modulator to be switched-on to place it in a conductive status ON, whereas the second low status of the control signal enables the switch to be placed in a non-conductive status OFF. Thus, the modulator can therefore always remain in operation on receipt of an alternating magnetic field of a radio-frequency signal picked up by the antenna coil.

Advantageously, the first sensitive clock extractor is configured to have a switching threshold that is lower than the switching threshold of the modulator rectifier block to rectify the alternating voltage of the coil. The threshold of the first clock extractor can be in the order of 100 mV. In contrast, the second inverter clock extractor is configured to have a switching threshold that is higher than or equal to the threshold of the modulator rectifier block, e.g. in the order of 0.6 V.

Advantageously, the double clock extractor unit comprises a flip-flop controlled at input by the modulation signal and a signal combining the modulation signal with the clock signal of the second clock extractor, and a multiplexer controlled by the selection signal supplied by the flip-flop. The multiplexer receives as input the first and second clock signals of the first and second clock extractors and supplies an output clock signal depending on the status of the selection signal. Because of an arrangement of logic elements, of the flip-flop and the multiplexer, no loss of pulses of the clock signal supplied as output by the double clock extractor unit occurs in particular during the transition from the high status to the low status of the modulation signal. Therefore, the clock signal of the first clock extractor remains selected as output of the double clock extractor even if the modulation signal moves to the low status and until the level of input voltage of the unit is higher than or equal to the threshold of the second inverter clock extractor. Conversely, the transition of the modulation signal from low status to high status does not cause any loss of pulses of the clock signal output from the double extractor unit.

Advantageously, a mono-flop is arranged between the double clock extractor unit and the control logic to enable supply of a detection signal of the field interruption on a descending edge coming from the double clock extractor unit after a determined period of time. This mono-flop is able to detect the field interruption irrespective of the status of the modulation signal of the modulator in operation.

BRIEF DESCRIPTION OF THE DRAWINGS

The aims, advantages and features of the transponder circuit with double clock extractor unit shall become clearer in the following description of at least one non-restrictive embodiment illustrated by the drawings.

DETAILED DESCRIPTION OF THE INVENTION

In the following description all parts of the transponder circuit that are well known to a person skilled in the art in this technical field are only outlined in a simplified manner. This transponder circuit is preferably of a passive type and is configured for the receipt and transmission of low-frequency radio-frequency signals in a range of 100 to 150 kHz.

Figure 1:
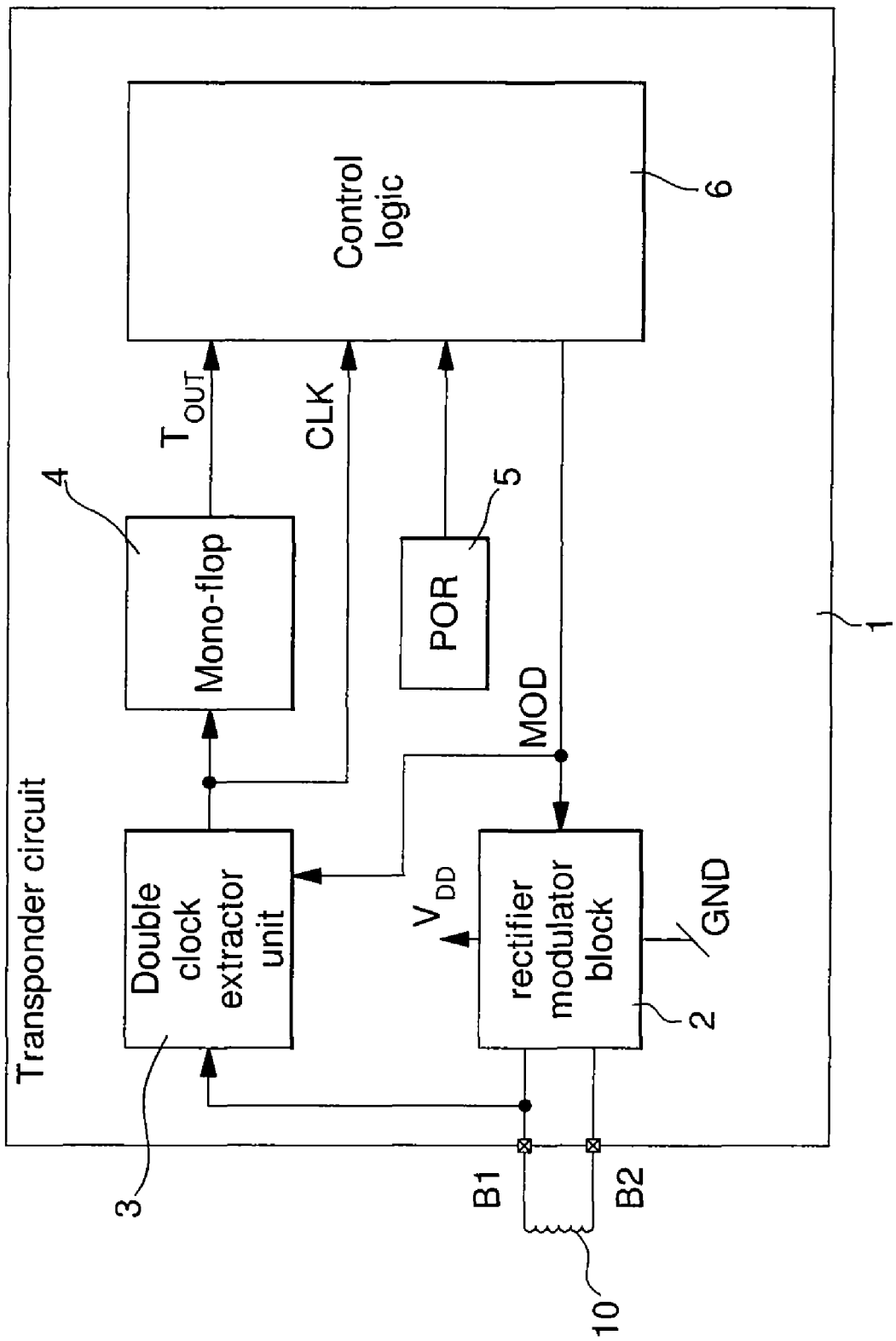
FIG. 1 shows a simplified block diagram of a low-power transponder circuit according to the invention.

FIG. 1 schematically shows the essential components of a passive low-power transponder circuit 1 according to the invention that can operate, for example, at a frequency in the order of 125 kHz. Firstly, this transponder circuit 1 comprises an antenna coil 10 connected via two terminals B1, B2 to a modulator rectifier block 2 explained below with reference to FIG. 2. This rectifier block 2 supplies a rectified supply voltage $V_{DD}$ to supply the components of the transponder circuit on the basis of an alternating magnetic field of sufficient amplitude of a radio-frequency signal picked up by the antenna coil.

The radio-frequency signal, which is picked up by the antenna coil, can come from a reader located in close proximity to the transponder circuit 1, e.g. in a zone of some meters around the transponder circuit. In general, the radio-frequency signal transmitted by the reader is firstly an interrogation signal in order to detect any adjacent transponder circuit that is capable of responding to the interrogation signal. Once communication has been established between the reader and the transponder circuit, the reader can transmit data and/or commands in the radio-frequency signal at a determined carrier frequency, primarily by amplitude modulation.

The transponder circuit 1 also comprises a double clock extractor unit 3, which will be explained in more detail below with reference to FIG. 3, that is connected across at least one terminal B1 of the antenna coil 10, a control logic 6 timed by a clock signal CLK supplied by the double clock extractor unit, and a power-on control block POR 5 to ensure voltage regulation and adequate initialisation of the control logic 6. The control logic 6 supplies a modulation signal MOD to the modulator rectifier block 2 for the transmission of a radio-frequency data signal via the antenna coil and also to the double clock extractor unit for selection of one clock extractor or the other. The clock signal of a sensitive clock extractor of the double clock extractor unit 3 is selected by the modulation signal when the modulation signal MOD is in a first high status defined as ON. The clock signal of a second inverter clock extractor is selected when the modulation signal MOD is in a second low status defined as OFF.

A mono-flop 4 is also provided to receive the clock signal CLK of the double clock extractor unit 3 and supply an interruption signal $T_{OUT}$ of the radio-frequency signal to the control logic subsequent to an interruption of the clock signal. The interruption signal $T_{OUT}$ enables the control logic to detect the instant of start of data and/or commands transmitted in the radio-frequency signal to be received subsequent to the field interruption. The reaction time of this mono-flop is greater than the amplitude transition time of the alternating voltage at the level of the antenna coil because of the change in status of the modulation signal MOD. In this way, the interruption signal $T_{OUT}$ is produced to inform the control logic 6 only when the clock signal has stopped for at least the reaction time of this mono-flop 4.

The low-power passive transponder circuit 1 can be configured, for example, with a structure similar to a transponder circuit sold by EM Microelectronic-Marin SA, Switzerland, under reference EM 4205 or EM 4305 "512 bit READ/WRITE CONTACTLESS IDENTIFICATION DEVICE". Therefore, it also comprises a demodulator and a memory, particularly of the EEPROM type, which is not shown in FIG. 1.

Figure 2:
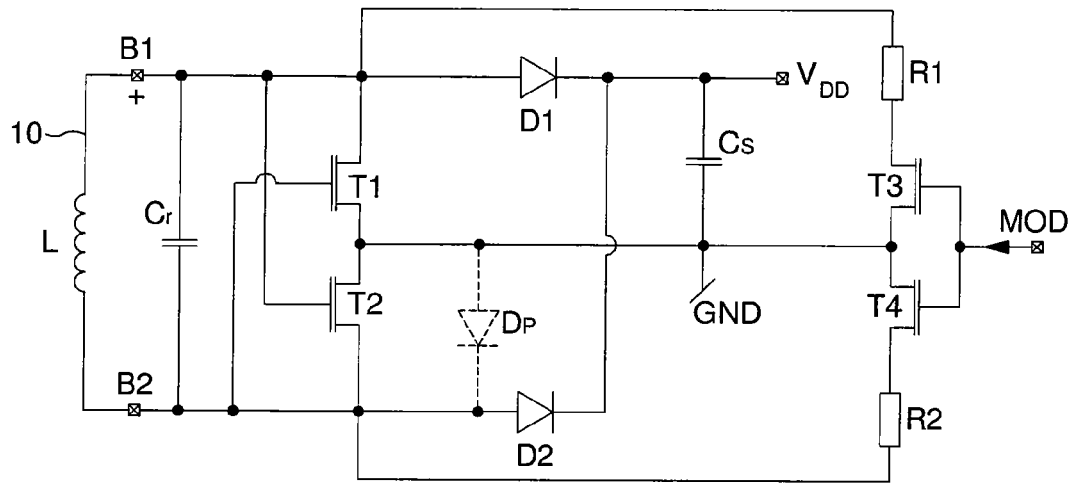
FIG. 2 shows the modulator rectifier block connected to the antenna coil of the transponder circuit according to the invention.

FIG. 2 shows the different elements of the modulator rectifier block 2. A capacitor Cr is connected in parallel across two terminals B1 and B2 of the antenna coil 10 to form a resonant circuit together with the coil. The inductance L of the antenna coil 10 and the capacitive value of the capacitor Cr are chosen as a function of the carrier frequency of the radio-frequency signal to be picked up.

The rectifier part for converting the alternating voltage of the resonant circuit actuated by the alternating magnetic field of a picked up radio-frequency signal at a rectified supply voltage $V_{DD}$ is well known to a person skilled in the art in this technical field. It consists of a full-wave rectifier.

Therefore, this rectifier part comprises a first NMOS transistor T1 and a second NMOS transistor T2, which are connected in series between the two terminals B1 and B2 of the resonant circuit, a diode D1, a diode D2 and a capacitor Cs for storing the rectified voltage $V_{DD}$. The drain terminal of the first transistor T1 is connected across terminal B1 of the resonant circuit. The gate terminal of transistor T1 is connected across terminal B2 of the resonant circuit and the source terminal of transistor T1 is connected across the drain terminal of transistor T2. The gate terminal of transistor T2 is connected across terminal B1 of the resonant circuit and the source terminal of transistor T2 is connected across terminal B2 of the resonant circuit. The earth terminal GND of the capacitor Cs is connected to the connection node between the first and second transistors T1 and T2. The anode of diode D1 is connected across terminal B1. The anode of diode D2 is connected across terminal B2. Finally, the cathodes of diodes D1 and D2 are connected across the terminal of capacitor Cs, which supplies the rectified voltage $V_{DD}$. Since the transponder circuit, with the exception of the antenna coil, is configured in an integrated circuit, e.g. using CMOS technology, the effect of parasitic diodes Dp shown in broken lines in FIG. 2 in parallel with the second transistor T2 must also be taken into account in general.

To obtain a rectified voltage $V_{DD}$ at the terminals of capacitor Cs, the amplitude of the alternating voltage of the resonant circuit has to be higher than the threshold of the rectifier, which corresponds to the threshold of a traditional inverter, i.e. to the conduction threshold of each NMOS transistor. This threshold voltage can be in the order of 0.6 V.

The modulator rectifier block also comprises a modulator part, which comprises at least one switch controlled by a modulation signal MOD and a resistor to connect in parallel to the resonant circuit. This modulator part preferably comprises two switches, which are formed by two NMOS transistors T3 and T4, and two resistors R1 and R2, which can have the same value. The source terminal of transistor T3 and the drain terminal of transistor T4 are connected across the earth terminal GND. The resistor R1 is connected between terminal B1 of the resonant circuit and the drain terminal of transistor T3, while the resistor R2 is connected between terminal B2 of the resonant circuit and the source terminal of transistor T4. The gate of the two transistors T3 and T4 is controlled by the modulation signal MOD.

When the modulation signal MOD is in high status defined as ON at a voltage value higher than the threshold voltage of each transistor T3 and T4 relative to earth, each transistor T3 and T4 becomes conductive. Thus, the two resistors R1 and R2 are arranged in parallel to the resonant circuit. In this state, the amplitude of the alternating voltage of the resonant circuit is greatly reduced by the in-parallel arrangement of the resistors. Depending on the chosen resistive value of the resistors, the amplitude can decrease, for example, to an alternating voltage value in the order of 150 mV, well below the threshold of the rectifier. However, when the modulation signal MOD is in the low status defined as OFF with a voltage value that is lower than the threshold voltage of each transistor T3 and T4, the two transistors are in a non-conductive state. The amplitude of the alternating voltage of the resonant circuit remains at the highest level depending on the amplitude of the picked up radio-frequency signal.

With an arrangement in the pulse time of the modulation signal MOD defining a high status ON, while the interval between each pulse defines a low status OFF, it is possible to transmit data via the antenna coil by amplitude modulation. Therefore, the modulator is always in operation on continuous receipt of the radio-frequency signal of determined carrier frequency coming from a reader close by. This amplitude modulation for the transponder circuit of the present invention can be a "deep amplitude modulation".

With a low amplitude modulation of the modulator of the transponder circuit, referred to as "shallow modulation", the amplitude of the alternating voltage of the resonant circuit does not generally drop below a threshold of an inverter. In such a case, a traditional transponder circuit, which uses a single inverter clock extractor, could be used.

Figure 3:
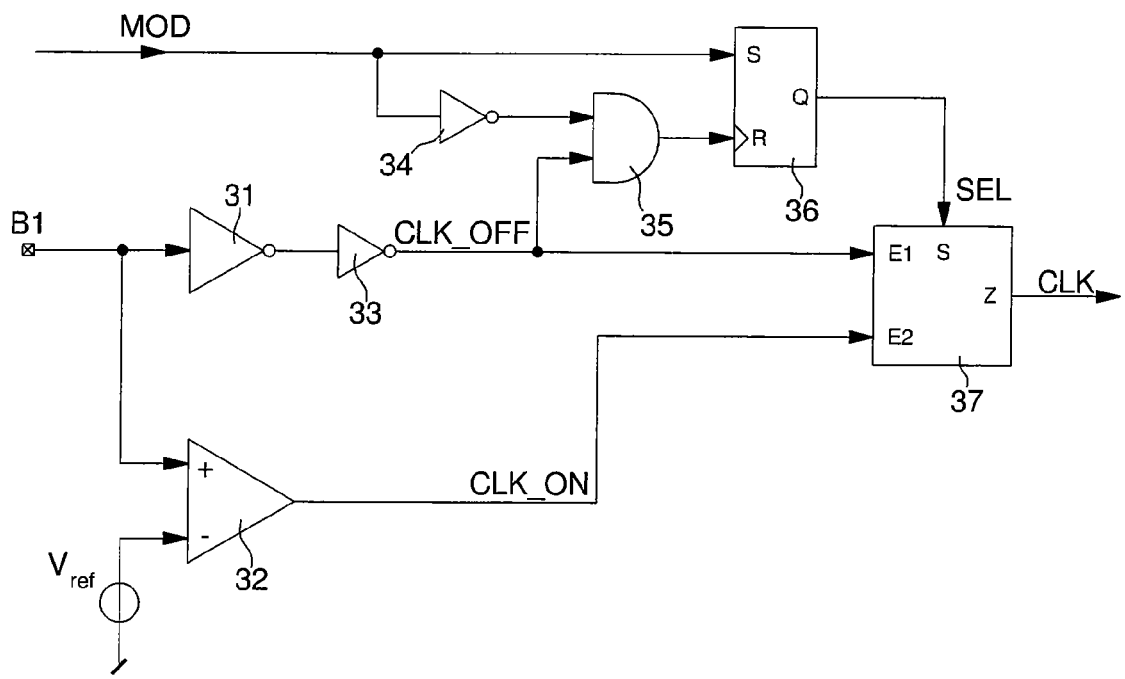
FIG. 3 shows a simplified representation of the different components of the double clock extractor unit of the transponder circuit according to the invention.
Figure 4:
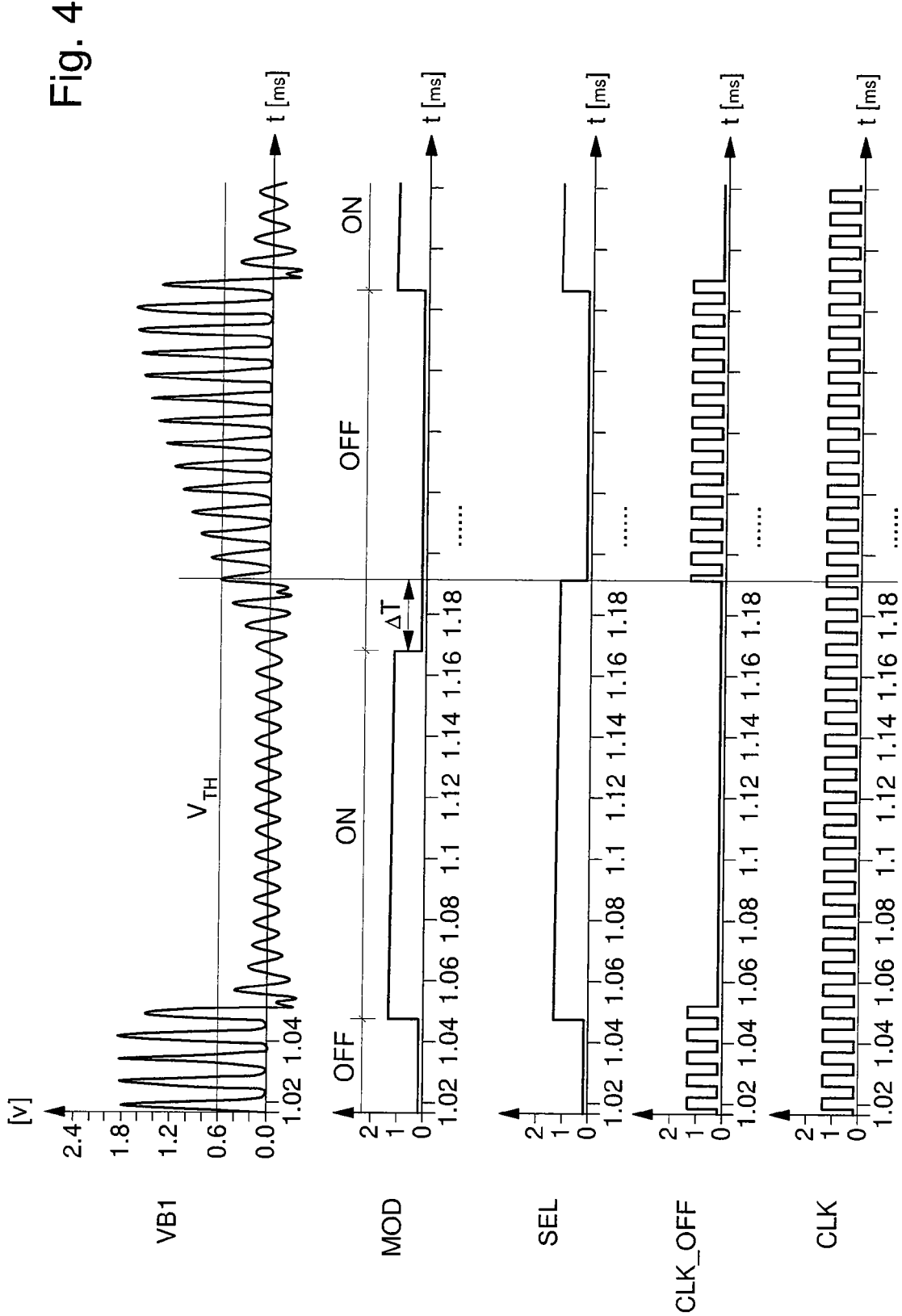
FIG. 4 shows a time chart of different signals of the double clock extractor unit as a function of the status of the switch of the modulator of the transponder circuit according to the invention.

As may be seen with reference to the diagrams shown in FIG. 4, the transition time from a low level to a high level of amplitude of the alternating voltage of the resonant circuit is longer during the transition from the status ON to the status OFF of the modulation signal than the transition time from the high level to the low level of the amplitude of the alternating voltage of the resonant circuit during the transition from the status OFF to the status ON of the modulation signal. The double clock extractor unit described below with reference to FIG. 3 is configured in order to take into account this transition time to always remain synchronous without any loss of pulses of the clock signal supplied as output of the unit.

The double clock extractor unit of FIG. 3 comprises a first sensitive clock extractor 32, a second inverter clock extractor 31, 33, a RS flip-flop 36, logic elements 34, 35 and a multiplexer 37 to supply a clock signal CLK of one of the clock extractors selected as a function of the status of the modulation signal MOD.

The first sensitive clock extractor consists of a voltage comparator 32. This voltage comparator 32 receives the alternating voltage coming from the antenna coil via terminal B1 at a positive input and a low reference voltage, e.g. in the order of 100 mV, at a negative input to define the low threshold of the sensitive clock extractor. A clock signal CLK_ON, which consists of a series of pulses at a frequency identical to the frequency of the alternating voltage of the antenna coil, is supplied as output from the voltage comparator 32. It is, of course, necessary that the maximum voltage of the alternating voltage signal of the antenna coil is above the low threshold in order to produce the series of pulses of the clock signal CLK_ON.

The second inverter clock extractor essentially consists of a first inverter 31, which can be followed by a second inverter 33 in order to supply a clock signal CLK_OFF as output. This clock signal CLK_OFF consists of a series of pulses at a frequency identical to the frequency of the alternating voltage of the antenna coil received by terminal B1. The series of pulses of the clock signal is produced so long as the maximum voltage of the alternating voltage signal of the antenna coil is above a high threshold of the inverter $V_{TH}$, which can be in the order of 0.6 V. This high threshold can correspond to that of a HVNMOS transistor. Traditionally, the first inverter 31 can comprise a PMOS transistor and a NMOS transistor, connected in series between the rectified supply voltage and earth. The PMOS transistor can be a small-channel type, while the NMOS transistor can be a large-channel type in order to form an unbalanced inverter. The connected gates of these two transistors are controlled by the alternating voltage of the antenna coil, while the connection node of the two transistors supplies a clock signal which is inverted by the second inverter 33 in order to supply the clock signal CLK_OFF.

The RS flip-flop 36 of the double clock extractor unit is controlled at an input S (Select) by the modulation signal MOD and at a reset input R (Reset) by a signal combining the modulation signal MOD with the clock signal CLK_OFF of the second clock extractor. This combination of signals is obtained by an AND logic element 35, which receives as input the modulation signal inverted by an inverter 34 and the clock signal CLK_OFF, in order to supply the combined signal to the input R (Reset) of the RS flip-flop. This avoids having a high status defined as binary "1" simultaneously at inputs S and R of the flip-flop that can generate an undesirable status as output Q of the flip-flop.

The selection signal SEL as output of the RS flip-flop 36 is supplied to the multiplexer 37, which receives as input the two clock signals CLK_ON and CLK_OFF of the two clock extractors. As a function of the status of the selection signal SEL, the clock signal of one of the clock extractors is supplied as output from the multiplexer. The output clock signal CLK of the multiplexer 37 allows the control logic of the transponder circuit to be clocked and to be supplied to the mono-flop for the detection of an interruption in the magnetic field picked up by the antenna coil.

Because of the arrangement of the logic elements 34, 35 and the flip-flop 36, no loss of pulses of the output clock signal CLK is observed in particular during the transition from the high status ON to low status OFF of the modulation signal MOD. Good synchronisation of the clock signal is maintained independently of the status of the modulation signal MOD. The clock signal CLK_ON of the first clock extractor therefore remains selected as output of the multiplexer even if the modulation signal MOD moves to low status and until the voltage level at the input of the second clock extractor is higher than or equal to the high inverter threshold of the second inverter clock extractor. However, the transition of the modulation signal from low status to high status does not cause any loss of pulses of the output clock signal of the double clock extractor unit.

When the second clock extractor is selected to supply the clock signal CLK, a detection of the interruption in the magnetic field is achieved more quickly than when the first clock extractor is selected.

FIG. 4, which shows different voltage signals plotted in relation to time in the double clock extractor unit, can be referred to for better representation of the selection of one clock extractor or the other without loss of pulses of the clock signal CLK.

This FIG. 4 shows the alternating voltage VB1 at terminal B1 of the antenna coil with a frequency close to 125 kHz. This alternating voltage present at terminal B1 has an indicated maximum amplitude close to 1.8 V when the modulation signal MOD is in the low status defined by OFF. The form of this alternating voltage at maximum amplitude present at terminal B1 of the antenna coil is only half of the alternation of the total alternating voltage present at the two terminals of the antenna coil. This is due to the operation of the modulator rectifier block, which allows the alternating voltage at the terminals of the antenna coil to be rectified, given that the amplitude of this voltage is above the threshold of the rectifier, which corresponds to the inverter threshold $V_{TH}$.

However, the amplitude of this alternating voltage VB1 is reduced substantially and quickly to a value close to 150 mV, for example, when the modulation signal MOD moves from the low status defined by OFF to the high status defined by ON. In this case, the alternating voltage signal at terminal B1 of the antenna coil is in a sinusoidal form centred relative to earth. However, during the transition from the status ON to the status OFF of the modulation signal MOD, several alternating voltage cycles are necessary at the terminals of the antenna coil to return to a maximum amplitude, as can be seen on the graph of voltage VB1. This is mainly due to the quality factor of the antenna coil of the transponder circuit.

Even if the modulation signal MOD has moved from a status ON to an status OFF, it is necessary to wait for the level of the amplitude of the alternating voltage to reach the inverter threshold $V_{TH}$ of the second clock extractor. Once the amplitude of the alternating voltage is sufficient, the second inverter clock extractor is able to once again supply a clock signal CLK_OFF. A period of time ΔT in the order of 0.02 ms must therefore be observed before the clock signal CLK_OFF is output from the multiplexer of the double extractor unit when the selection signal SEL moves from the high status to the low status. During this time period ΔT the first clock extractor, which is still in operation, supplies the output clock signal of the double clock extractor unit, as shown, for example, by the clock signal CLK in FIG. 4. In contrast, the transition from the low status to the high status of the selection signal SEL occurs very quickly as the same time as the transition from low status to high status of the modulation signal MOD.

Because of the arrangement of the double clock extractor unit according to the invention, no loss of pulses of the clock signal CLK is observed at the output of the double clock extractor unit, whatever the status of the modulation signal for the modulator in operation. As a result of this, the transponder circuit of the present invention can always remain synchronous even with the modulator in operation, so that an interruption in the magnetic field picked up by the antenna coil can be detected when the modulation signal is in the high status or in the low status.

On the basis of the description just given, numerous variants of the transponder circuit with double clock extractor can be designed by a person skilled in the art without departing from the framework of the invention as defined in the claims. The transponder circuit can possibly be configured to be active instead of passive. It should be noted that the transponder circuit can be designed to also pick up signals at HF, VHF or UHF frequencies.

What is claimed is:

1. A transponder circuit with double clock extractor unit, said transponder circuit comprising an antenna coil connected to a modulator rectifier block to supply a rectified supply voltage on the basis of a radio-frequency signal picked up by the antenna coil at determined frequency and sufficient amplitude, wherein a terminal of the antenna coil is connected to the double clock extractor unit, and a control logic receiving a clock signal of the double clock extractor unit and supplying a modulation signal to the modulator rectifier block, wherein the double clock extractor unit comprises a first sensitive clock extractor and a second inverter clock extractor, and wherein the modulation signal is supplied to the double clock extractor unit to select the clock signal produced by the first clock extractor when the modulation signal is in a first status, or the clock signal produced by the second clock extractor when the modulation signal is in a second status wherein the first sensitive clock extractor has a low switching threshold below a switching threshold of the modulator rectifier block to rectify the alternating voltage of the antenna coil, and wherein the second inverter clock extractor has a high switching threshold equal to or higher than the threshold of the modulator rectifier block, wherein the first sensitive clock extractor comprises a comparator, of which a positive input is connected across one of the terminals of the antenna coil and a negative input is polarised by a reference voltage with a value below the threshold voltage of the modulator rectifier block in the order of 100 mV, wherein the output of the comparator supplies the clock signal of the first clock extractor, and wherein the second inverter clock extractor comprises at least a first inverter connected as input across the same terminal of the antenna coil as the first clock extractor.

2. The transponder circuit according to claim 1, wherein the second inverter clock extractor comprises a second inverter connected as output of the first inverter in order to supply as output the clock signal of the second clock extractor.

3. The transponder circuit according to claim 1, wherein it comprises a monoflop receiving a clock signal of the double clock extractor unit and supplying an interruption signal of the radio-frequency signal to the control logic subsequent to an interruption of the clock signal.

4. The transponder circuit according to claim 1, wherein the double clock extractor unit comprises a multiplexer to receive as input the clock signal of the first sensitive clock extractor and the clock signal of the second inverter clock extractor, and to supply as output one of the clock signals of the first and second clock extractors, which is selected by a selection signal depending on the status of the modulation signal.

5. The transponder circuit according to claim 4, wherein the double clock extractor unit comprises a RS type flip-flop, of which a first input receives the modulation signal and a second input receives a combined signal supplied by an AND-type element, which receives as input the clock signal of the second inverter clock extractor and an inverted signal of the modulation signal, wherein the flip-flop supplies as output the selection signal to control the multiplexer, and wherein the multiplexer supplies as output a clock signal of the second clock extractor when the modulation signal is in a second low status with a clock signal produced by the second clock extractor in operation, wherein the multiplexer supplies as output the clock signal of the first clock extractor when the modulation signal is in a first high status.

6. The transponder circuit according to claim 1, wherein a modulator part of the modulator rectifier block comprises at least one switch connected in series to at least one resistor, wherein said switch with the resistor are arranged in parallel with the antenna coil, and wherein the switch is controlled by the modulation signal to be conductive and to arrange the resistor directly in parallel with the antenna coil to reduce the amplitude of the alternating voltage of the signal picked up by the antenna coil, when the modulation signal is in a first high status, and to be non-conductive when the modulation signal is in a second low status.

7. The transponder circuit according to claim 6, wherein the modulator part comprises two switches and two resistors, wherein a first switch, which is a MOS transistor, is connected in series with a first resistor to be disposed between an earth defined as output of the modulator rectifier block and a first terminal of the antenna coil, wherein a second switch, which is a MOS transistor, is connected in series with a second resistor to be disposed between the earth and a second terminal of the antenna coil, and wherein a gate of each MOS transistor is controlled directly by the modulation signal.

8. A transponder circuit with double clock extractor unit, said transponder circuit comprising an antenna coil connected to a modulator rectifier block to supply a rectified supply voltage on the basis of a radio-frequency signal picked up by the antenna coil at determined frequency and sufficient amplitude, wherein a terminal of the antenna coil is connected to the double clock extractor unit, and a control logic receiving a clock signal of the double clock extractor unit and supplying a modulation signal to the modulator rectifier block, wherein the double clock extractor unit comprises a first sensitive clock extractor and a second inverter clock extractor, and wherein the modulation signal is supplied to the double clock extractor unit to select the clock signal produced by the first clock extractor when the modulation signal is in a first status, or the clock signal produced by the second clock extractor when the modulation signal is in a second status, and wherein it comprises a monoflop receiving a clock signal of the double clock extractor unit and supplying an interruption signal of the radio-frequency signal to the control logic subsequent to an interruption of the clock signal.

9. A transponder circuit with double clock extractor unit, said transponder circuit comprising an antenna coil connected to a modulator rectifier block to supply a rectified supply voltage on the basis of a radio-frequency signal picked up by the antenna coil at determined frequency and sufficient amplitude, wherein a terminal of the antenna coil is connected to the double clock extractor unit, and a control logic receiving a clock signal of the double clock extractor unit and supplying a modulation signal to the modulator rectifier block, wherein the double clock extractor unit comprises a first sensitive clock extractor and a second inverter clock extractor, and wherein the modulation signal is supplied to the double clock extractor unit to select the clock signal produced by the first clock extractor when the modulation signal is in a first status, or the clock signal produced by the second clock extractor when the modulation signal is in a second status, and wherein the double clock extractor unit comprises a multiplexer to receive as input the clock signal of the first sensitive clock extractor and the clock signal of the second inverter clock extractor, and to supply as output one of the clock signals of the first and second clock extractors, which is selected by a selection signal depending on the status of the modulation signal.

* * * * *